(12) United States Patent
Sheckler

(10) Patent No.: US 12,434,611 B2
(45) Date of Patent: Oct. 7, 2025

(54) CONVERTIBLE SLAT-BASED BED ASSEMBLY

(71) Applicant: Winnebago Industries, Inc., Eden Prairie, MN (US)

(72) Inventor: Amelia Sheckler, Forest City, IA (US)

(73) Assignee: Winnebago Industries, Inc., Eden Prairie, MN (US)

( * ) Notice: Subject to any disclaimer, the term of this patent is extended or adjusted under 35 U.S.C. 154(b) by 109 days.

(21) Appl. No.: 18/403,287

(22) Filed: Jan. 3, 2024

(65) Prior Publication Data

US 2024/0253548 A1     Aug. 1, 2024

Related U.S. Application Data

(60) Provisional application No. 63/441,239, filed on Jan. 26, 2023.

(51) Int. Cl.
*B60N 3/00*     (2006.01)
*B60N 2/02*     (2006.01)

(52) U.S. Cl.
CPC ........... *B60N 3/008* (2013.01); *B60N 2/0292* (2013.01)

(58) Field of Classification Search
None
See application file for complete search history.

(56) References Cited

U.S. PATENT DOCUMENTS

| 7,574,758 | B2 | 8/2009 | Arason et al. |
| 11,786,046 | B2 | 10/2023 | Lee et al. |
| 2010/0325810 | A1 | 12/2010 | Dahlin et al. |
| 2022/0355739 | A1 | 11/2022 | Smith |

FOREIGN PATENT DOCUMENTS

EP     1385405 B1     11/2006

OTHER PUBLICATIONS

Tom Edwards, "L-shaped extendable campervan bed", available at https://www.bytomedwards.com/2020/07/l-shaped-extendable-bed.html.

*Primary Examiner* — Adam C Ortiz
(74) *Attorney, Agent, or Firm* — Faegre Drinker Biddle & Reath LLP

(57) ABSTRACT

Systems for a slat bed are provided. The slat bed may include a fixed portion including a plurality of fixed slats and a sliding portion pivotably coupled to the fixed portion. The sliding portion may include a plurality of sliding slats and the plurality of sliding slats may be operable to slide adjacent to the plurality of fixed slats to change a length of the slat bed. The sliding portion may also be operable to move upwardly at an inclined angle relative to the fixed portion.

20 Claims, 13 Drawing Sheets

CONVERTIBLE SLAT-BASED BED ASSEMBLY

CROSS REFERENCE TO RELATED APPLICATION

This application claims priority to U.S. Provisional Patent Application No. 63/441,239, entitled "Convertible Slat-Based Bed Assembly," filed Jan. 26, 2023, the contents of which are hereby incorporated by reference in its entirety.

SUMMARY

In certain embodiments of the present disclosure, a recreational vehicle includes a body with a cab area and a living space area. A slat bed is positioned in the living space area and includes a fixed portion including a plurality of fixed slats and a sliding portion pivotably coupled to the fixed portion. The sliding portion includes a plurality of sliding slats, and the plurality of sliding slats are operable to slide adjacent to the plurality of fixed slats to change a length of the slat bed. The sliding portion is operable to move upwardly at an inclined angle relative to the fixed portion.

In a variation thereof, the slat bed is positioned adjacent to a rear door of the recreational vehicle. In a further variation thereof, the sliding portion folds upwards at the inclined angle such that the sliding portion faces the rear door when at the inclined angle.

In another variation thereof, the fixed portion and sliding portion are pivotably coupled about a rounded hinge joint. In yet another variation thereof, the slats in the plurality of fixed slats and the slats in the plurality of sliding slats are rectilinear slats. In still another variation thereof, the slat bed further includes a pivot leg, the pivot leg operable to change the inclined angle of the sliding portion relative to the fixed portion. In still another variation thereof, the slat bed further includes a support, the support attached to the fixed portion to hold the fixed portion in place within the living space area.

In an additional variation thereof, the recreational vehicle further includes a cushion having multiple sections movable with respect to each other to define a plurality of positions, at least one of the sections being supported by the fixed portion. In yet an additional variation thereof, the cushion is arranged to convert into a chair position, a couch position, and a bed position. In still an additional variation thereof, the sections are coupled via zippers. In still an additional variation thereof, the sections are coupled via hook and loop.

In certain embodiments of the present disclosure, a slat bed includes a fixed portion with a plurality of fixed slats and a sliding portion pivotably coupled to the fixed portion. The sliding portion includes a plurality of sliding slats, and the plurality of sliding slats are operable to slide adjacent the plurality of fixed slats to change a length of the slat bed. The sliding portion is operable to move upwardly at an inclined angle relative to the fixed portion.

In a variation thereof, the inclined angle is between about 0° and about 90°. In a further variation thereof, the inclined angle is about 45°.

In another variation thereof, the slat bed further comprises a cushion having multiple sections movable with respect to each other to define a plurality of positions, at least one of the sections being supported by the fixed portion. In yet another variation thereof, the cushion is operable to transition between a chair, a bed, and a couch. In still another variation thereof, the multiple sections include at least two sections. In still another variation thereof, the multiple sections are removably coupled. In still another variation thereof, the removable coupling includes a zipper coupling. In still another variation thereof, the multiple sections are free floating.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
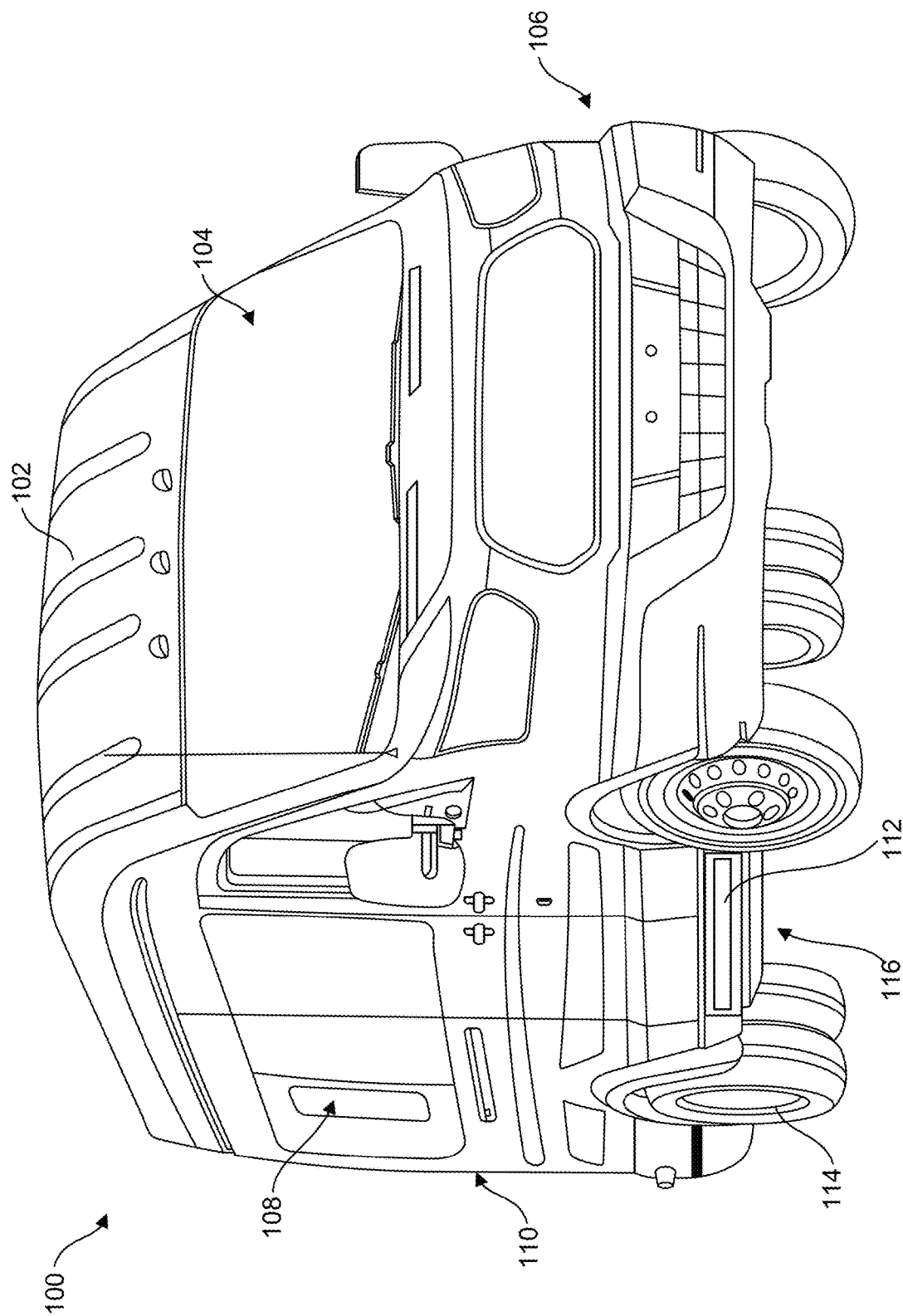
FIG. 1 shows a recreational vehicle, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

The present disclosure describes slat bed systems that provide various benefits when used with vehicles such as a recreational vehicle. As one example, certain embodiments of the present disclose allow passengers of the recreational vehicle to comfortably view a surrounding scenery while looking out of a rear door or rear window of the recreational vehicle. As another example, certain embodiments of the present disclosure allow for passengers of the recreational vehicle to configure a cushion on the slat bed into a plurality of positions (e.g., a chair, a bed, or a couch). As another example, certain embodiments of the present disclose allow passengers of the recreational vehicle to recline the slat bed at an inclined angle for comfortable viewing of the surrounding scenery.

FIG. 1 shows a recreational vehicle 100 having a body 102 that houses a cab area 104 at a front end 106 of the recreational vehicle 100 and a living space area 108 positioned between the cab area 104 and a rear end 110 of the recreational vehicle 100. The recreational vehicle 100 can include one or more power sources (represented by block 112 for simplicity of illustration) that are operably coupled to (e.g., via a transmission, shafts) front and/or rear axles and that provide the energy to rotate the axle(s) and/or wheels 114 and therefore propel the recreational vehicle 100. The power source 112 can include an engine (e.g., gas engine or diesel engine), rechargeable batteries, fuel cell, or a combination (e.g., hybrid) of an engine and rechargeable batteries, etc.

In embodiments where the recreational vehicle 100 is at least partially powered and propelled by electricity created by batteries 112, the batteries 112 can be distributed throughout the chassis of the recreational vehicle 100. For example, the batteries 112 may be positioned below a floor of the living space area 108 of the recreational vehicle 100. In certain embodiments, the batteries 112 power electric motors that rotate one or more of the wheels 114 (e.g., by rotating the axles or by directly rotating the wheels).

Although FIG. 1 shows what is typically referred to as a Class B recreational vehicle or a camper van, embodiments of the present disclosure can be used in other types of motorized recreational vehicles (e.g., Class A recreational vehicles, Class C recreational vehicles, and the like), non-motorized types of recreational vehicles (e.g., 5th wheel trailers, travel trailers, and the like), and marine recreational vehicles.

Figure 2:
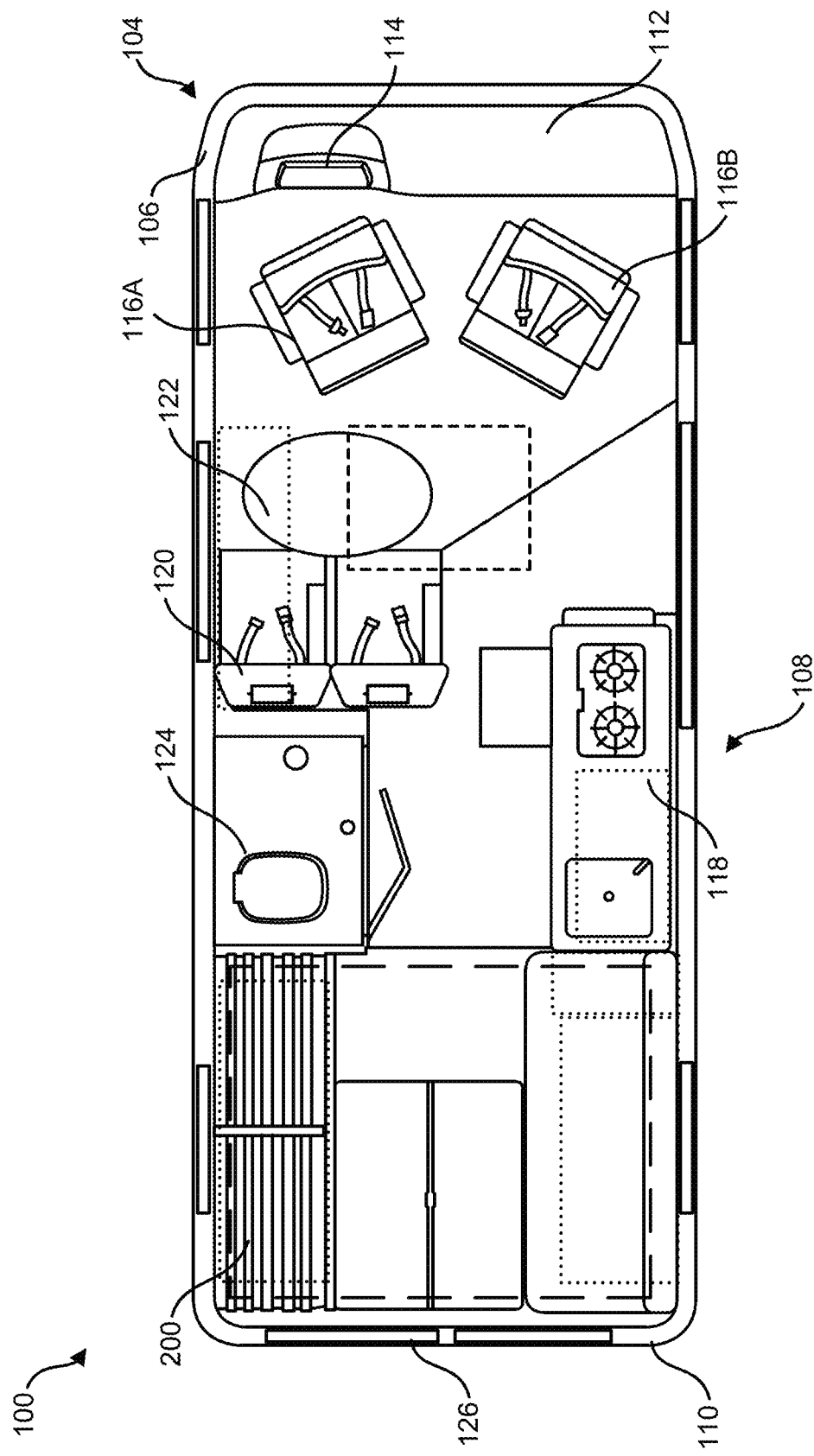
FIG. 2 shows a top-down view of a schematic floor plan of the recreational vehicle of FIG. 1, in accordance with certain embodiments of the present disclosure.

FIG. 2 shows a top-down view of a schematic floorplan of the recreational vehicle 100 of FIG. 1. The floorplan is just one example of how embodiments of the present disclosure can be used with recreational vehicles such as the recreational vehicle 100.

As shown in FIG. 2, the recreational vehicle 100 can include a driver's seat 116A and a passenger's seat 116B located in the cab area 104. The driver's seat 116A and the passenger's seat 116B can rotate to face various directions (e.g., forward when driving, aft when parked, and therebetween). The living space area 108 of the recreational vehicle 100 can also include a kitchen area 118, additional passenger seating 120, a table 122, a wet bath area 124, and a slat bed 200. The recreational vehicle 100 may also include a rear door 126 at the rear end 110. The rear door 126 may include, but is not limited to, a single door or a double door. The rear door 126 may also include a window.

Figure 3:
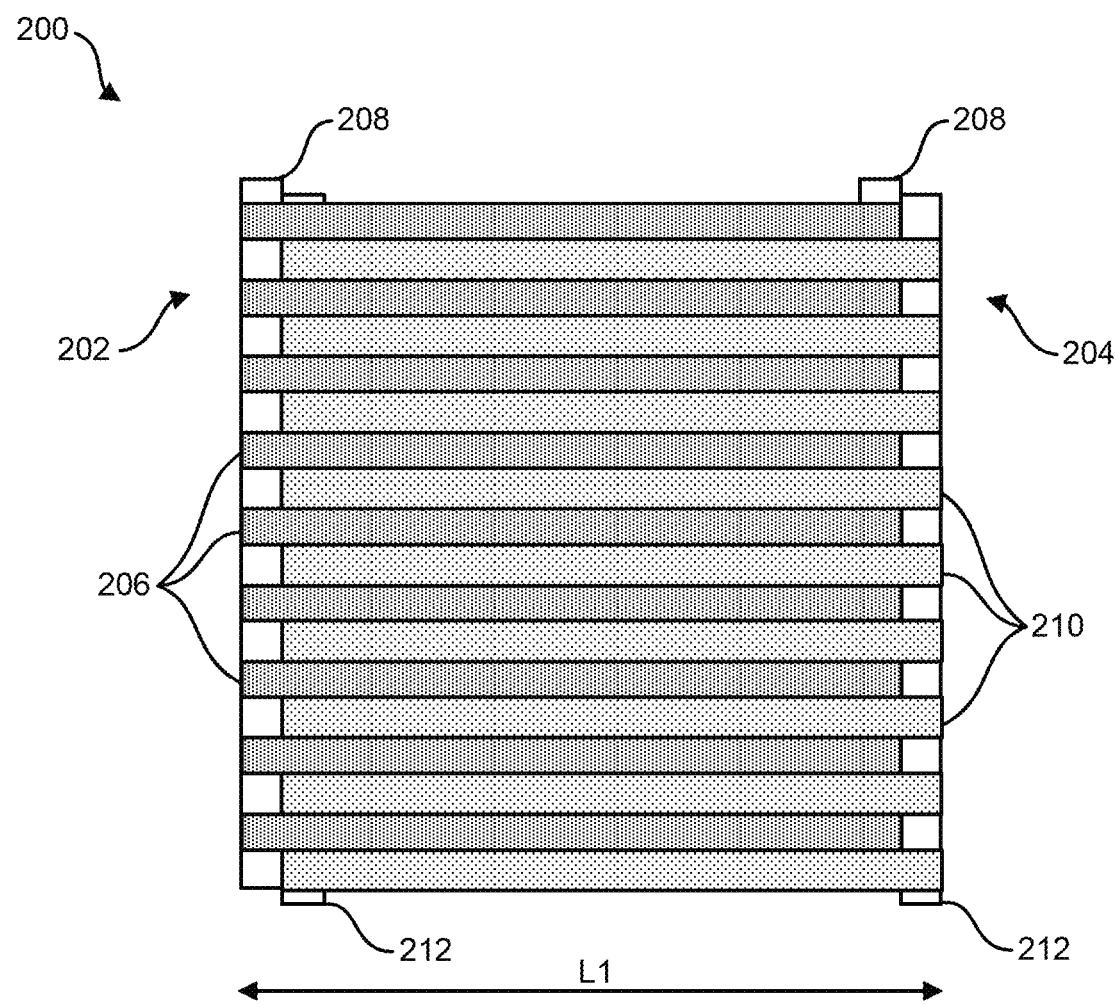
FIG. 3 shows a slat bed in a condensed position, in accordance with certain embodiments of the present disclosure.

FIG. 3 shows a slat bed 200 in a condensed position. The slat bed 200 of FIG. 3 may be substantially similar to the slat bed 200 as shown in FIG. 2. The slat bed 200 may be located in the living space area 108 of the recreational vehicle 100. For example, the slat bed 200 may be positioned adjacent to the rear door 126 at the rear end 110 of the recreational vehicle 100, as shown in FIG. 2. In another example, the slat bed 200 may be positioned adjacent a side door located in the living space area 108 of the recreational vehicle 100.

Further to FIG. 3, the slat bed 200 includes a fixed portion 202 and a sliding portion 204. The fixed portion 202 includes a plurality of fixed slats 206. The plurality of fixed slats 206 may include rectilinear slats (e.g., rectangular-shaped slats). Each of the fixed slats in the plurality of fixed slats 206 may be made of wood, including, but not limited to oak. Each of the fixed slats in the plurality of fixed slats 206 may be made of the same material, or may be made of different materials. Each of the fixed slats in the plurality of fixed slats 206 are coupled to a set of fixed slat posts 208, which are located on either side of the fixed slats. Each fixed slat of the plurality of fixed slats 206 may be coupled to the fixed slat posts 208 on both sides of the fixed slat and along a short end of the slat (e.g., the short end of the rectangular shape). Each fixed slat of the plurality of fixed slats 206 may be coupled to each other via the fixed slat posts 208. The fixed slat posts 208 may be made of metal, including but not limited to, aluminum. The fixed slat posts 208 may further include housings (e.g., housings 220 of FIG. 9) for coupling to each slat of the plurality of slats 206. The housings 220 may be sized to fit the short end of each fixed slat in the plurality of fixed slats 206. The housings 220 may include, but are not limited to, plastic or metal.

Further to FIG. 3, the sliding portion 204 is pivotably coupled to the fixed portion 202 and the sliding portion 204 includes a plurality of sliding slats 210. The plurality of sliding slats 210 may be substantially similar to the plurality of fixed slats 206 and may also include rectilinear slats shaped as rectangles. Each of the sliding slats of the plurality of sliding slats 210 are coupled to a set of sliding slat posts 212, located on either side of the sliding slat. The sliding slat posts 212 may be substantially similar to the fixed slat posts 208 and may also include housings (e.g., housings 220 of FIG. 9) for coupling to each sliding slat in the plurality of sliding slats 210.

In the condensed position of FIG. 3, the fixed portion 202 and the sliding portion 204 are positioned alongside each other over a length of the slat bed 200. The plurality of fixed slats 206 and the plurality of sliding slats 210 are positioned alongside each other along substantially the whole length of the slats. In the condensed position, the length of the slat bed 200 is minimized and defines a condensed length L1.

Figure 4:
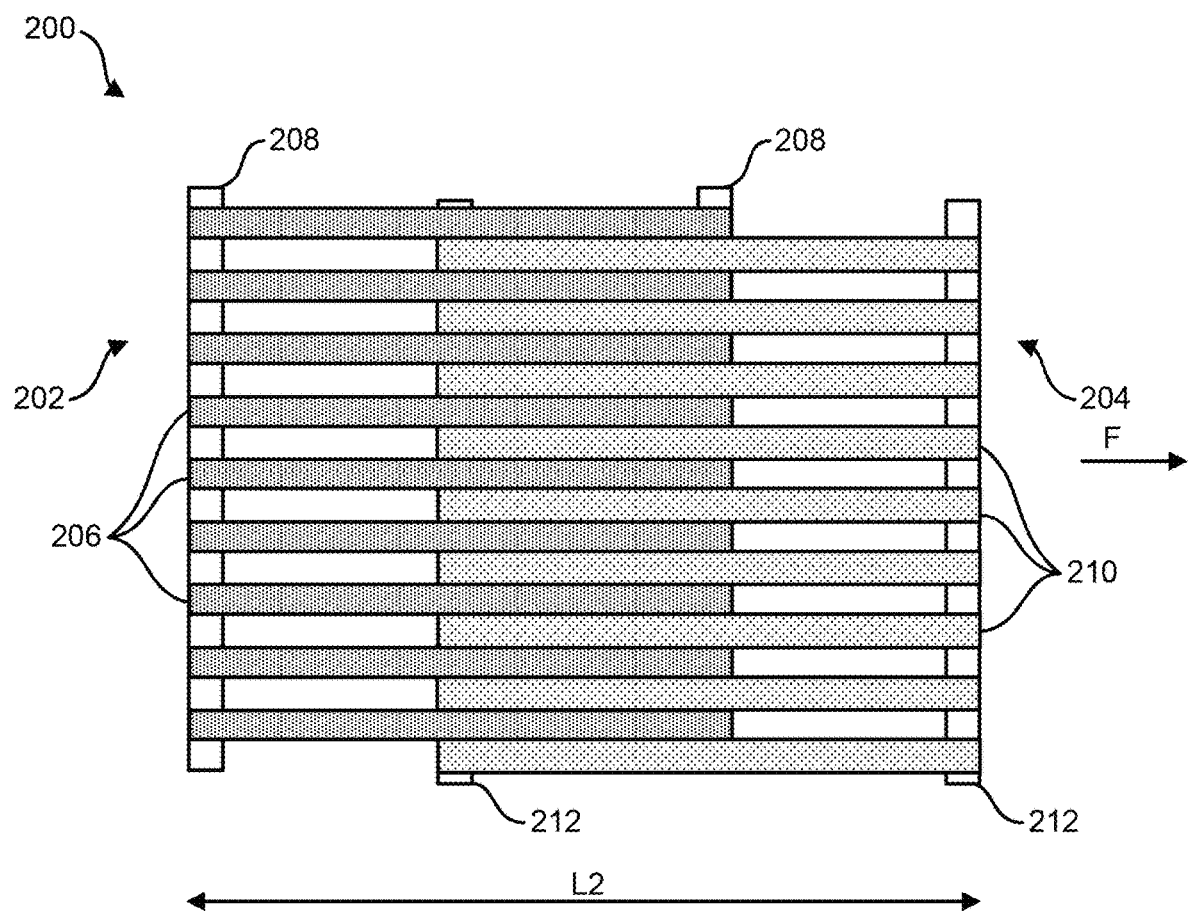
FIG. 4 shows an intermediate position of the slat bed of FIG. 3, in accordance with certain embodiments of the present disclosure.

FIG. 4 shows an intermediate position of the slat bed 200. The plurality of sliding slats 210 are operable to slide adjacent to the plurality of fixed slats 206 to change a length of the slat bed 200. The fixed portion 202 may be anchored to a support (e.g., a bed cabinet or a part of a recreational vehicle) such that it does not slide. Due to the inclusion of rectilinear slats, the plurality of sliding slats 210 may move in a substantially straight line. The plurality of sliding slats 210 may start sliding upon a force F being applied to the sliding portion 210 such that the slat bed 200 is transitioned from the condensed position (see e.g., FIG. 3) to the intermediate position. In some embodiments, the force F may come from a user pulling the sliding portion 204 outwardly relative to the fixed portion 202 without mechanical assistance (e.g., wheels). In other embodiments, the force F may be facilitated by wheels or a rolling support located below the sliding portion 210 (not shown). The force F may be applied linearly, or in the same plane as the fixed portion 202 to avoid damage to the rectilinear slats. The sliding portion 204 and the fixed portion 202 may be engaged in a friction fit. The friction fit may be such that more force F is needed to move the sliding portion 204 out of the condensed position (see, e.g., FIG. 3) than to move the sliding portion out of the intermediate position and toward an extended position (see, e.g., FIG. 5). This feature may assist in preventing the sliding portion 204 from moving while the recreational vehicle 100 is in motion (e.g., driving).

In the intermediate position of FIG. 4, the fixed portion 202 and the sliding portion 204 are positioned alongside each other over a partial length of the slat bed. The plurality of fixed slats 206 and the plurality of sliding slats 210 are positioned alongside each other along a partial length of the slats. In the intermediate position, the length of the slat bed is longer than the condensed length L1 of the slat bed 200 and defines an intermediate length L2, which is longer than length L1. The intermediate position may be defined along any position between the condensed position and the extended position (see, e.g., FIG. 5) and is not limited to the intermediate position shown in FIG. 4.

Figure 5:
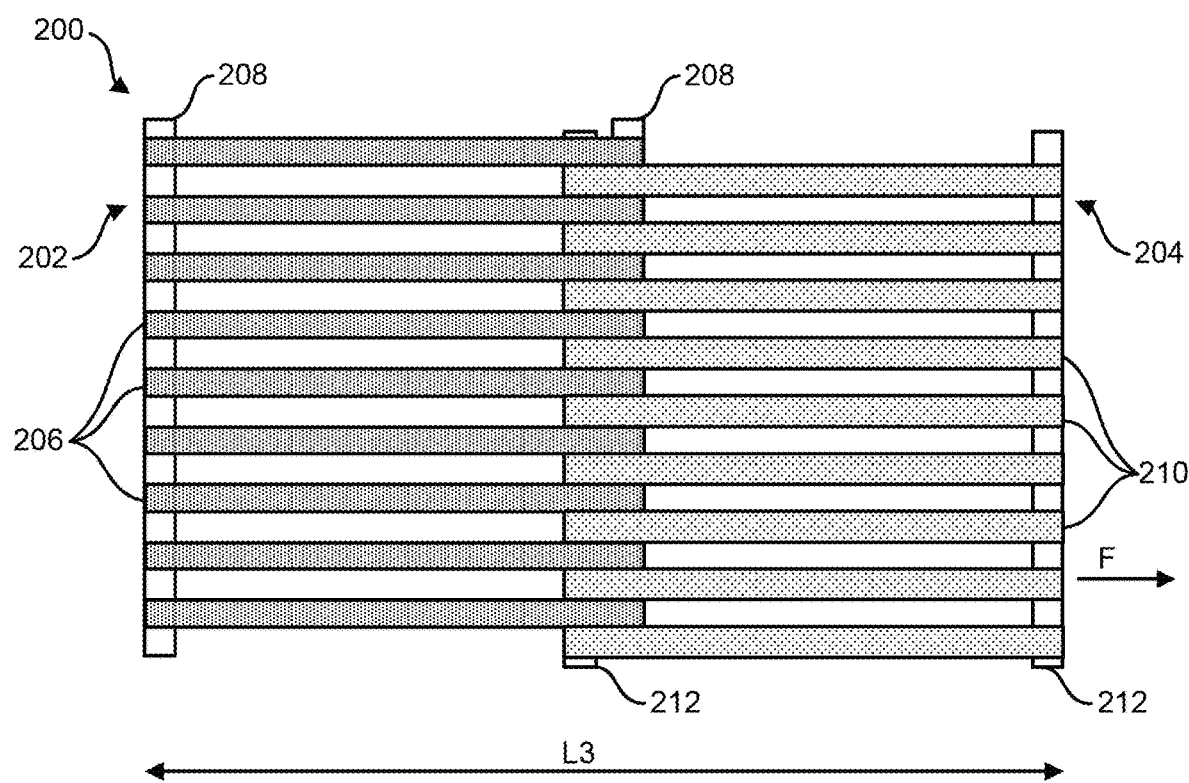
FIG. 5 shows an extended position of the slat bed of FIG. 3, in accordance with certain embodiments of the present disclosure.

FIG. 5 shows the extended position of the slat bed 200. Similar to transitioning to the intermediate position of FIG. 4, the plurality of sliding slats 210 may transition the slat bed 200 to the extended position by application of a force F. The force F may come from a user pulling the sliding portion 204 outwardly relative to the fixed portion 202. In the extended position, the plurality of fixed slats 206 and the plurality of sliding slats 210 are no longer positioned alongside each other. In the extended position, a length of the slat bed is maximized and defines an extended length L3. The extended length L3 is longer than both the intermediate length L2 (see, e.g., FIG. 4) and the condensed length L1 (see, e.g., FIG. 3).

In some embodiments, when in the extended position, the fixed slat post 208 and sliding slat post 212 may be adjacent to each other. In some embodiments, the fixed slat post 208 and sliding slat post 212 may define a hinge 222 (shown in FIG. 6) which pivotably couples that fixed portion 202 and the sliding portion 204. In some embodiments, the hinge is a rounded hinge joint. In some embodiments, both the fixed slat post 208 and the sliding slat post 212 may be rounded to form the rounded hinge joint.

Figure 6:
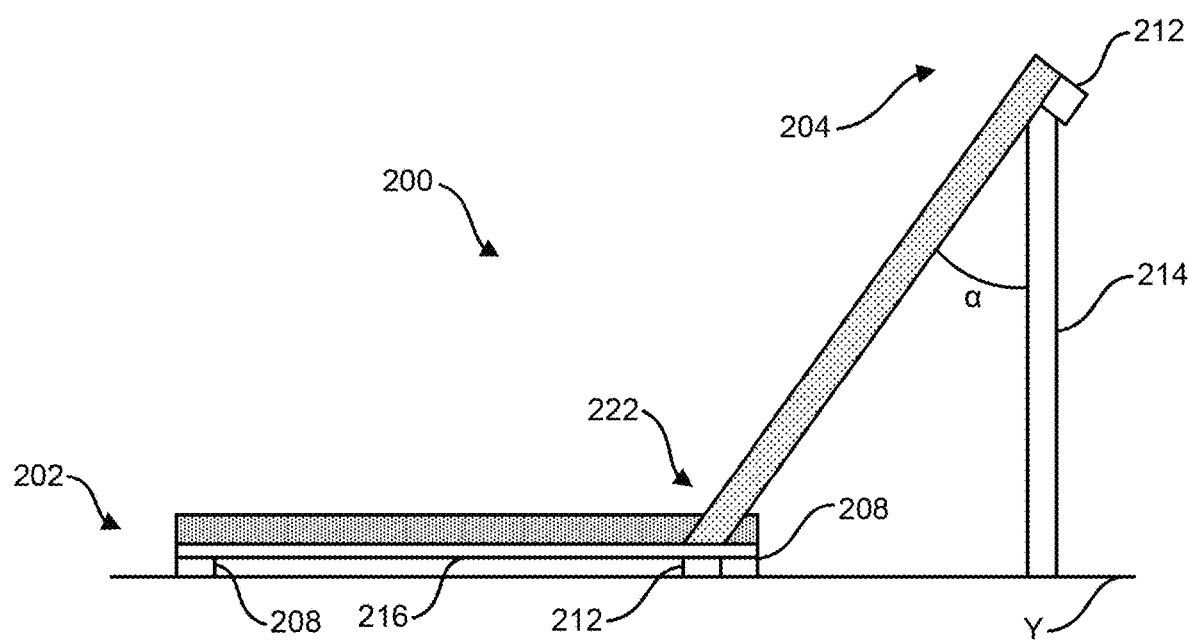
FIG. 6 shows an inclined position of the slat bed of FIG. 3, in accordance with certain embodiments of the present disclosure.

FIG. 6 shows an inclined position of the slat bed 200. The sliding portion 204 is operable to move (e.g., fold) upwardly at an inclined angle α relative to the fixed portion 202. In some embodiments, the inclined angle α may be an angle between about 0° and about 90°, or between about 0° and about 10°, or between about 10° and about 20°, or between about 20° and about 30°, or between about 30° and about 40°, or between about 40° and about 50°, or between about 50° and about 60°, or between about 60° and about 70°, or between about 70° and about 80°, or between about 80° and about 90°. In some embodiments, the inclined angle α is about 45°.

The slat bed 200 may further include a pivot leg 214. The pivot leg 214 may be operable to change the inclined angle α of the sliding portion 204 relative to the fixed portion 202. In some embodiments, the pivot leg 214 may be pivotably and slidably coupled to the sliding slat post 212 such that pivot leg 214 pivots from the end of the sliding slat post 212. In other embodiments, the pivot leg 214 may be pivotably and slidably coupled to the sliding position 204 itself. In use, when transitioning the slat bed 200 to the inclined position, a user may pull the pivot leg 214 out from the slat bed 200 via the pivotable coupling and place the pivot leg 214 on a floor or onto another surface (e.g., a cabinet or another raised structure) of the recreational vehicle 100 such that the inclined angle α of the sliding slat 204 is held in place. To change the inclined angle α, the user may slide the pivot leg 214 along a length of the sliding position 204 via the slidable coupling such that the inclined angle α is increased or decreased. Once the included angle α is changed, the pivot leg 214 can again be placed on the floor of the recreational vehicle 100 to hold the new inclined angle α of the sliding portion 204 in place.

In some embodiments, the sliding portion 204 may move (e.g., fold) upwards at the inclined angle α such that the sliding portion 204 faces the rear door 126 when at the inclined angle α. This may allow a user to look out the rear door 126 or out the window of the rear door 126 while the sliding portion 204 at the inclined angle α.

Further, the slat bed 200 may include a support 216. The support 216 may be attached to the fixed portion 202 to hold the fixed portion 202 in place within the living space area 108 of the recreational vehicle 100. The support 216 may be attached or anchored to the floor of the recreational vehicle 100. The support may help the slat bed 200 stay in place while the recreational vehicle 100 is driven or when the slat bed 200 is transitioned between the collapsed position (see, e.g., FIG. 3), the intermediate configuration (see, e.g., FIG. 4), the expanded configuration (see, e.g., FIG. 5) and the inclined position (see, e.g., FIG. 6). The support 216 may include a cabinet. The support 216 may also be positioned such that the pivot leg 214 is contacting the support 216 when the slat bed 200 is in the inclined position.

FIGS. 7A-7E show a cushion 218 transitioned into a plurality of positions where the cushion 218 is supported by the slat bed 200 of FIGS. 3-6. In some embodiments, the slat bed 200 of the recreational vehicle 100 further includes the cushion 218 having multiple sections 218A, 218B, 218C movable (e.g., rotatable) with respect to each other to define a plurality of positions where at least one of the sections 218A, 218B, 218C is supported by the fixed portion 202. A user may arrange the sections into the plurality of positions as desired. For example, the cushion 218 may be arranged to convert into a chair position (see, e.g., FIG. 8), a couch position (see, e.g., FIG. 10), and a bed position (see, e.g., FIG. 9). The sections 218A, 218B, and 218C may be configured to be coupled together (e.g., removably coupled) via zippers, hook-and-loop, or the like. By having the sections 218A, 218B, and 218C removably coupled to each other, the user may change the configuration of the sections and couple the sections together and provide structure to the cushion 218 and prevent movement of the cushion 218 configuration while the recreational vehicle 100 is in motion. In other embodiments, the sections 218A, 218B, 218C may be free floating (e.g., not coupled together) in the plurality of positions.

The cushion 218 of FIGS. 7A-7E is described with respect to three sections 218A, 218B, and 218C. However, in some embodiments, the cushion 218 can include fewer sections (see, e.g., FIGS. 9 and 11). In other embodiments, the cushion 218 can include more than three sections.

Figure 7A:
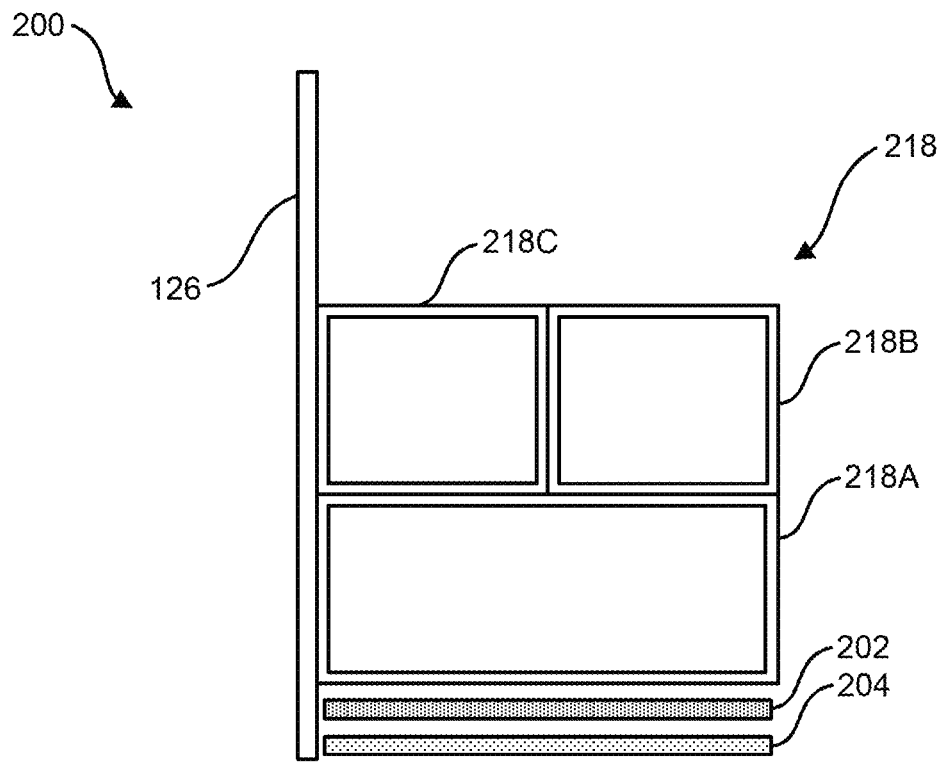
FIGS. 7A-7E show a cushion transitioned into a plurality of positions where the cushion is supported by the slat bed of FIGS. 3-6, in accordance with certain embodiments of the present disclosure.

FIG. 7A shows a schematic of the slat bed 200 in the condensed position (see, e.g., FIG. 3) with the cushion 218 arranged in a stacked position on top of the fixed portion 202 of the slat bed 200. In this embodiment, the section 218A has a longer dimension than the sections 218B and 218C and sections 218B and 218C are approximately the same size. However, the sections 218A, 218B, and 218C are not limited to these relative dimensions. In this embodiment, sections 218B and 218C are stacked on top of section 218A. In other embodiments, the sections 218A, 218B, and 218C may be in the reverse configuration where section 218A is on top of sections 218B and 218C. In some embodiments, the slat bed 200 may be adjacent to the rear door 126 of the recreational vehicle 100. The cushion 218 in the stacked position may be used as a couch, a bed, or a chair, as desired by the user.

Figure 7B:
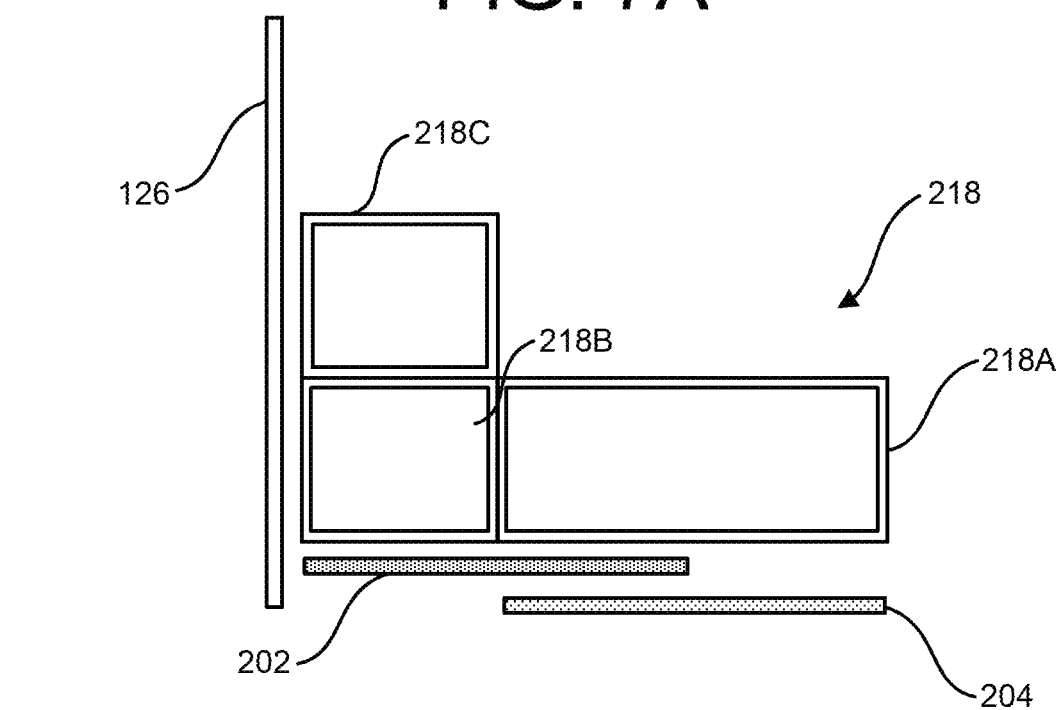

FIG. 7B shows a schematic of the slat bed 200 in the intermediate position (see, e.g., FIG. 4) with the cushion 218 arranged in a partially stacked position on top of the slat bed 200. In this embodiment, sections 218A and 218B are immediately adjacent and parallel to each other and section 218C is on top of section 218B. In other embodiments, the sections may be in the reverse configuration where section 218B is on top of sections 218C, and so forth. The partially stacked position of cushion 218 may be used as a couch, a bed, or a chair, as desired by the user.

Figure 7C:
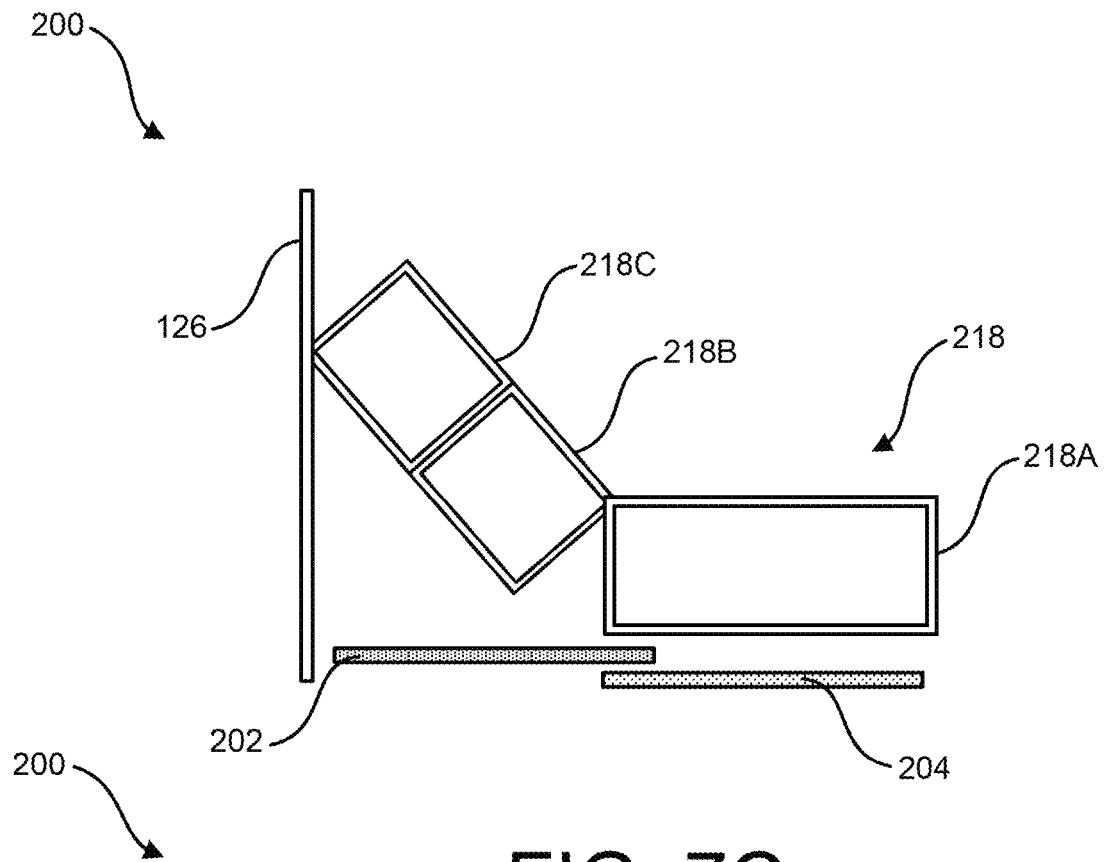

FIG. 7C shows a schematic of the slat bed 200 in the intermediate position (see, e.g., FIG. 4) with the cushion 218 arranged in an inclined position on top of the slat bed 200. In this embodiment, the cushion 218 in the inclined position is supported against the rear door 126 of the recreational vehicle 100, but the cushion 218 may also be supported by the pivot leg 214 of the slat bed (see, e.g., FIG. 7E). In this embodiment, sections 218B and 218C are inclined and section 218A is not inclined, but the reverse configuration is also contemplated. In this embodiment, the sections 218A, 218B and 218C may be coupled to each other (e.g., removably coupled) using zippers, hook and loop, or the like. The inclined position may be used as a couch, a bed, or a chair, as desired by the user.

Figure 7D:
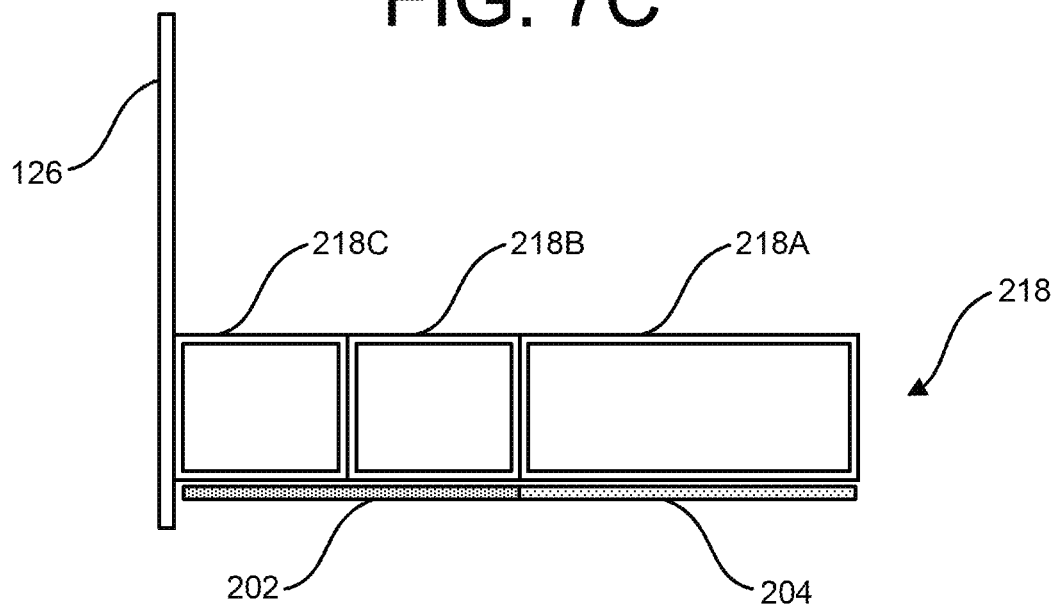

FIG. 7D shows a schematic of the slat bed 200 in the extended position (see, e.g., FIG. 5) with the cushion 218 arranged in a flat position on top of the slat bed 200. In this embodiment, the cushion 218 is arranged such that the sections 218A, 218B, and 218C are adjacent to each other and may be arranged in any order. In this configuration, all sections 218A, 218B, and 218C may be coupled to each other (e.g., removably coupled) using zippers, hook and loop, or the like. The flat position may be used as a bed, as desired by the user.

Figure 7E:
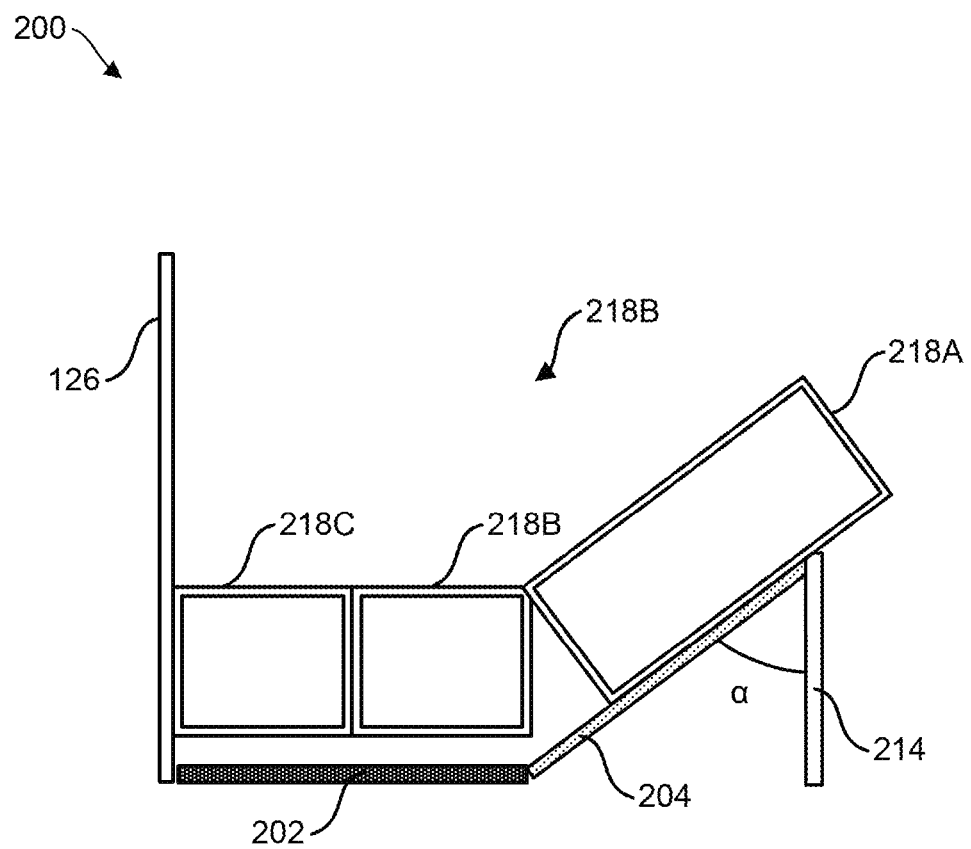

FIG. 7E shows a schematic of the slat bed 200 in the inclined position (e.g., as shown in FIG. 6) with the cushion 218 arranged in an inclined position on top of slat bed 200. In this embodiment, the cushion 218 is supported in the inclined position by the pivot leg 214. In this embodiment, the section 218A is inclined at the inclined angle α and is supported by the sliding portion 204, and the sections 218B and 218C are supported by the fixed portion 202, but the reverse configuration is contemplated. In this configuration, the sections 218A, 218B and 218C may be coupled to each other (e.g., removably coupled) using zippers, hook and loop, or the like. In this embodiment, section 218A is facing the rear door 126 of the recreational vehicle such that a user can look out the rear door 126, or a window on the rear door 126 while using the slat bed 200. The inclined position may be used as a couch, a bed, or a chair, as desired by the user. The inclined position may be at the inclined angle α as described above with respect to FIG. 6. For example, the inclined angle α may be at about 45°.

Figure 8:
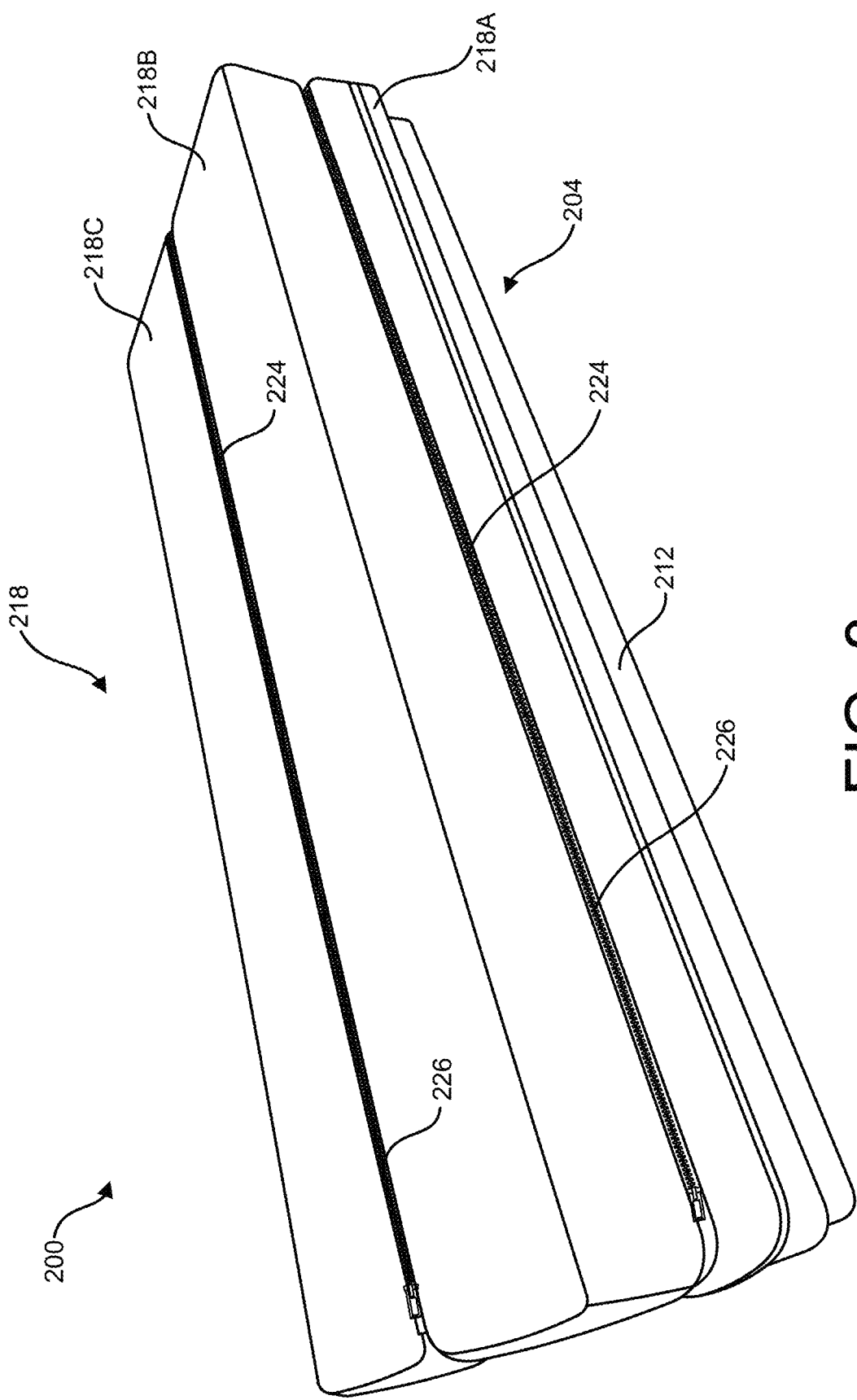
FIG. 8 shows the slat bed and cushion of FIG. 7 in a chair configuration, in accordance with certain embodiments of the present disclosure.

FIG. 8 shows the slat bed 200 in the condensed position as shown in FIG. 3 and the cushion 218 in the stacked position as shown in FIG. 7A. The stacked position of cushion 218 may be used as a chair. However, it is also contemplated that the stacked position of cushion 218 may be used as a bed or as a couch, as desired by the user. In this embodiment, the sections 218B and 218C each include a zipper 224. Further, the sections 218B and 218C are coupled via a zipper coupling 226 and sections 218A and 218B are coupled by the zipper coupling 226.

Figure 9:
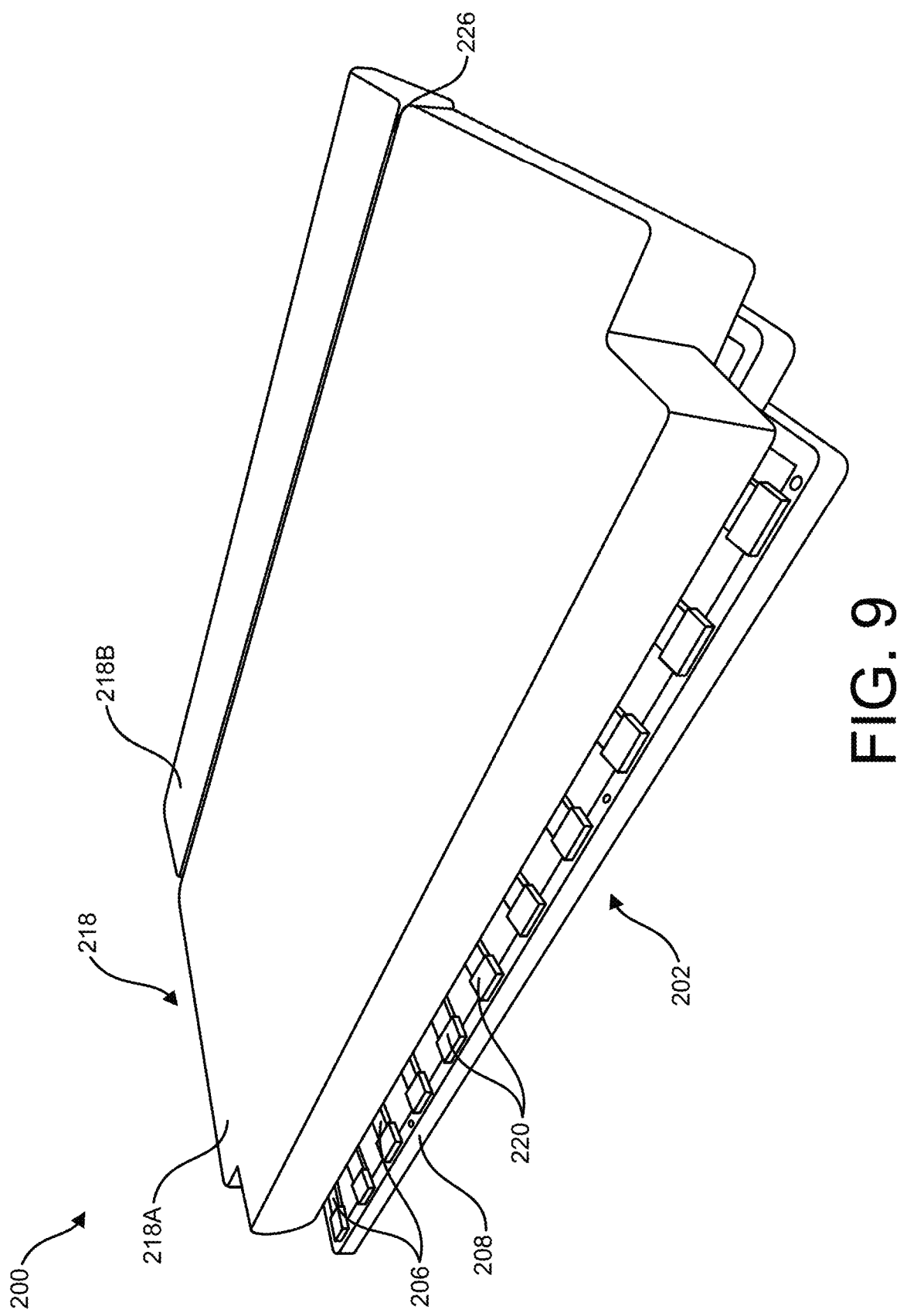
FIG. 9 shows the slat bed and cushion of FIG. 7 in a bed configuration, in accordance with certain embodiments of the present disclosure.

FIG. 9 shows the slat bed 200 in the extended position of FIG. 5 and the cushion 218 in the flat position of FIG. 7D. The flat position of cushion 218 may be used as a bed. However, it is also contemplated that the flat position of cushion 218 may be used as a chair or a couch, as desired by a user. In this embodiment, only two sections 218A and 218B are used to form the flat position, which may form a double size, or full sized bed. However, additional sections (e.g., section 218C) may also be used, which may form a queen size bed. In this embodiment, the housings 220 of the fixed portion 202 are shown to couple the plurality of fixed slats 206 to the fixed slat post 208. Although not shown, the plurality of sliding slats 210 may also include housings 220. In this embodiment, the sections 218A and 218B are coupled via the zipper coupling 226.

Figure 10:
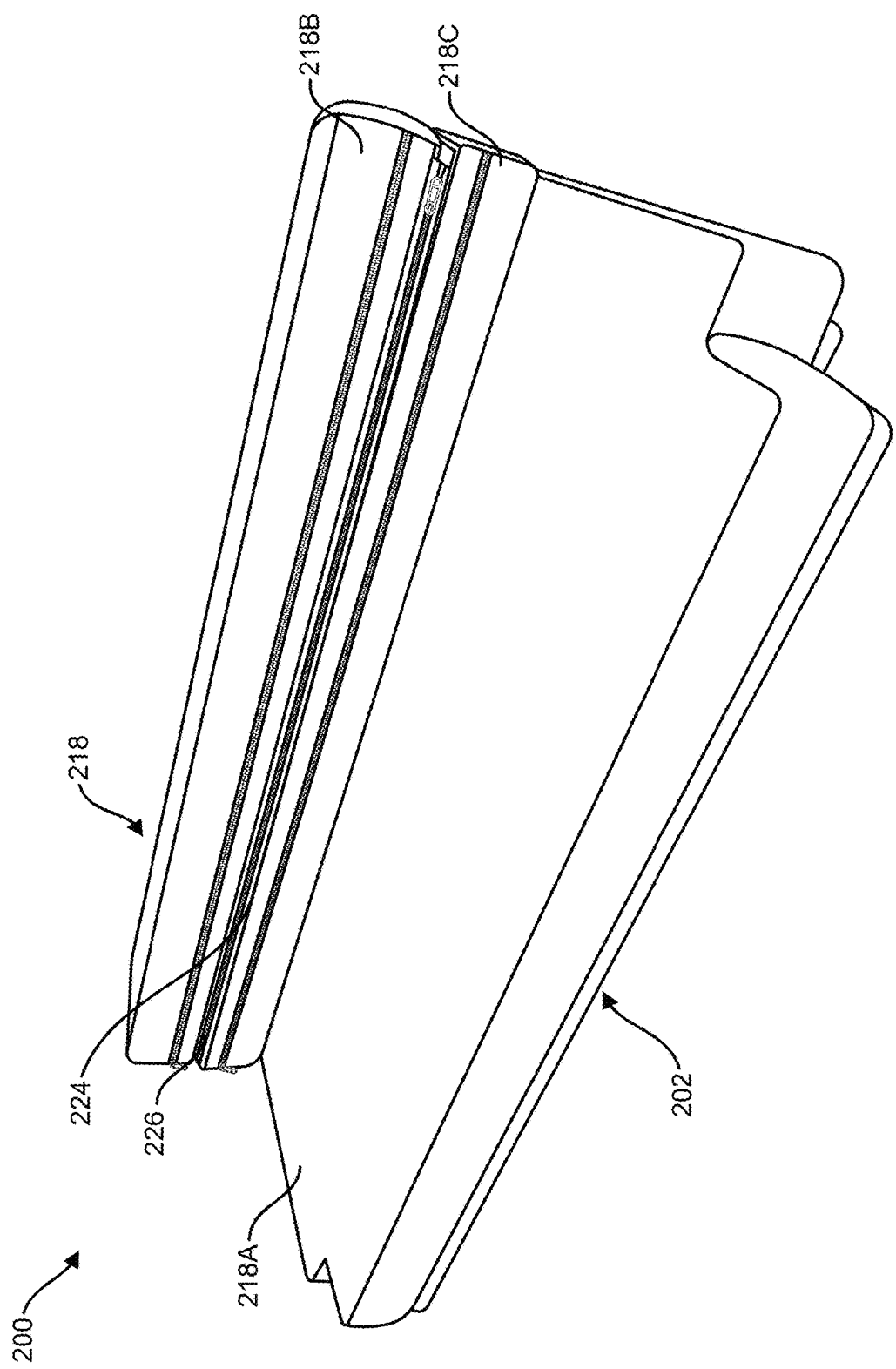
FIG. 10 shows the slat bed and cushion of FIG. 7 in a couch configuration, in accordance with certain embodiments of the present disclosure.

FIG. 10 shows the slat bed 200 in the extended position of FIG. 5 and the cushion 218 in the partially stacked position of FIG. 7B. The partially stacked position of cushion 218 may be used as a couch. However, it is also contemplated that the partially stacked position of cushion 218 may be used as a chair or a couch, as desired by a user. In this embodiment, three sections 218A, 218B, and 218C are used, but it is contemplated that fewer sections or additional sections may be used to form the partially stacked position. In this embodiment, the sections 218B and 218C include zippers 224 that are coupled via the zipper coupling 226.

Figure 11:
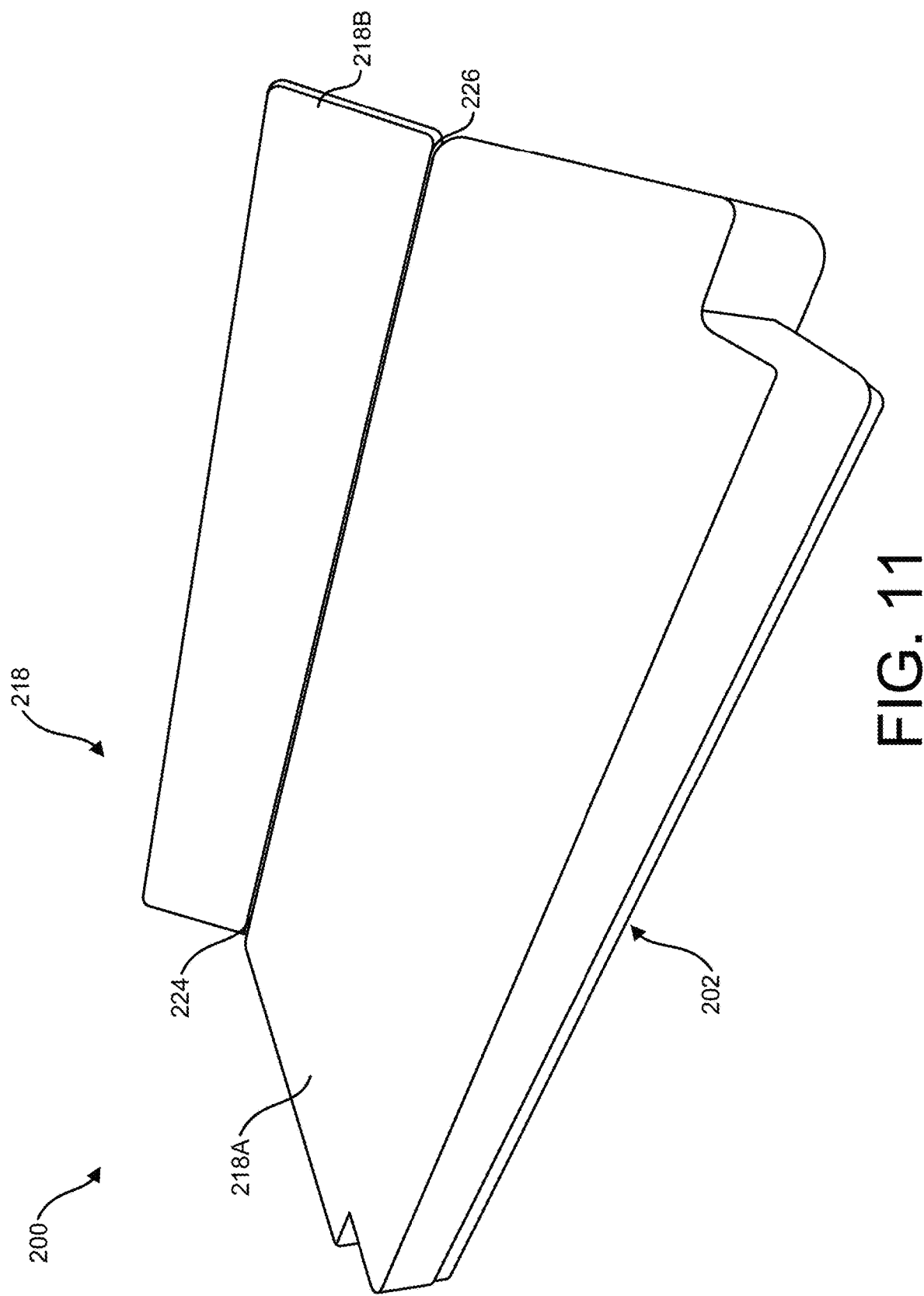
FIG. 11 shows the slat bed and cushion of FIG. 7 in an inclined configuration, in accordance with certain embodiments of the present disclosure.

FIG. 11 shows the slat bed 200 in the inclined position of FIG. 6 and the cushion 218 in the inclined position of FIG. 7E. The inclined position of cushion 218 may be used as a couch. However, it is also contemplated that the inclined position of cushion 218 may be used as a chair or a bed, as desired by the user. In this embodiment, two sections 218A and 218B are used in the inclined position. However, additional sections (e.g., section 218C) may also be used. In this embodiment, the sections 218A and 218B include zippers 224 and are coupled via the zipper coupling 226.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

The invention claimed is:

1. A recreational vehicle comprising: a body including a cab area and a living space area; and a slat bed in the living space area, the slat bed including: a fixed portion including a plurality of fixed slats, and a sliding portion pivotably coupled to the fixed portion, the sliding portion including a plurality of sliding slats, the plurality of sliding slats operable to slide adjacent to the plurality of fixed slats to change a length of the slat bed, the sliding portion operable to move upwardly at an inclined angle relative to the fixed portion; wherein the sliding portion allows for the slat bed to be useable in a first configuration having a first length and a second configuration having a second length longer than the first length.

2. The recreational vehicle of claim 1, wherein the slat bed is positioned adjacent to a rear door of the recreational vehicle.

3. The recreational vehicle of claim 2, wherein the sliding portion folds upwards at the inclined angle such that the sliding portion faces the rear door when at the inclined angle.

4. The recreational vehicle of claim 1, wherein the fixed portion and sliding portion are pivotably coupled about a rounded hinge joint.

5. The recreational vehicle of claim 1, wherein the slats in the plurality of fixed slats and the slats in the plurality of sliding slats are rectilinear slats.

6. The recreational vehicle of claim 1, wherein the slat bed further includes a pivot leg, the pivot leg operable to change the inclined angle of the sliding portion relative to the fixed portion.

7. The recreational vehicle of claim 1, wherein the slat bed further includes a support, the support attached to the fixed portion to hold the fixed portion in place within the living space area.

8. The recreational vehicle of claim 1, further comprising:
a cushion having multiple sections movable with respect to each other to define a plurality of positions, at least one of the sections being supported by the fixed portion.

9. The recreational vehicle of claim 8, wherein the cushion is arranged to convert into a chair position, a couch position, and a bed position.

10. The recreational vehicle of claim 8, wherein the sections are coupled via zippers.

11. The recreational vehicle of claim 8, wherein the sections are coupled via hook and loop.

12. A slat bed comprising: a fixed portion including a plurality of fixed slats; and a sliding portion pivotably coupled to the fixed portion, the sliding portion including a plurality of sliding slats, the plurality of sliding slats operable to slide adjacent the plurality of fixed slats to change a length of the slat bed, the sliding portion operable to move upwardly at an inclined angle relative to the fixed portion; wherein the sliding portion allows for the slat bed to be useable in a first configuration having a first length and a second configuration having a second length longer than the first length.

13. The slat bed of claim 12, wherein the inclined angle is between about 0° and about 90°.

14. The slat bed of claim 13, wherein the inclined angle is about 45°.

15. The slat bed of claim 12, further comprising:
a cushion having multiple sections movable with respect to each other to define a plurality of positions, at least one of the sections being supported by the fixed portion.

16. The slat bed of claim 15, wherein the cushion is operable to transition between a chair, a bed, and a couch.

17. The slat bed of claim 15, wherein the multiple sections includes at least two sections.

18. The slat bed of claim 15, wherein the multiple sections are removably coupled.

19. The slat bed of claim 18, wherein the removable coupling includes a zipper coupling.

20. The slat bed of claim 15, wherein the multiple sections are free floating.

* * * * *